United States Patent
Akbulut et al.

(10) Patent No.: US 11,853,335 B1
(45) Date of Patent: Dec. 26, 2023

(54) COOPERATIVE BUILD AND CONTENT ANNOTATION FOR CONVERSATIONAL DESIGN OF VIRTUAL ASSISTANTS

(71) Applicant: International Business Machines Corporation, Armonk, NY (US)

(72) Inventors: Muhtar Burak Akbulut, Waban, MA (US); Pankaj Dhoolia, Ghaziabad (IN); Andy James Stoneberg, Clarksburg, MD (US); Dan O'Connor, Cambridge, MA (US); Sachindra Joshi, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/806,559

(22) Filed: Jun. 13, 2022

(51) Int. Cl.
*G06F 16/332* (2019.01)
*G06F 16/31* (2019.01)

(52) U.S. Cl.
CPC .......... *G06F 16/332* (2019.01); *G06F 16/316* (2019.01)

(58) Field of Classification Search
CPC .............................. G06F 16/332; G06F 16/316
USPC ........................................................ 707/765
See application file for complete search history.

(56) References Cited

U.S. PATENT DOCUMENTS

| | | | |
|---|---|---|---|
| 8,095,523 B2 | 1/2012 | Brave | |
| 10,832,659 B2 * | 11/2020 | Ho | G06F 40/30 |
| 10,930,272 B1 * | 2/2021 | Orkin | G06N 20/00 |
| 11,455,357 B2 * | 9/2022 | Tiwari | G06F 16/9535 |
| 2020/0065373 A1 | 2/2020 | Santiago | |
| 2020/0142719 A1 | 5/2020 | Akbulut | |
| 2020/0219494 A1 | 7/2020 | Dhoolia | |
| 2020/0327190 A1 * | 10/2020 | Agrawal | G06V 40/174 |
| 2021/0019343 A1 * | 1/2021 | Singh | G06N 3/04 |
| 2021/0081613 A1 | 3/2021 | Begun | |

OTHER PUBLICATIONS

Berends, Jasper, "Specifying and Testing Conversational User Interfaces", Utrecht University, Bachelor Thesis, Information Science, Jul. 7, 2017, 45 Pages.

Choi et al., "ProtoChat: Supporting the Conversation Design Process with Crowd Feedback", Proceedings of the ACM on Human-Computer Interaction Archive, vol. 4, No. CSCW3, Dec. 2020, 27 pages.

McGregor, Blake, "Getting Started with the New Watson Assistant: The Build Guide Part I," Medium, Oct. 7, 2021, 21 Pages.

(Continued)

*Primary Examiner* — Kimberly L Wilson
(74) *Attorney, Agent, or Firm* — Stephanie L. Carusillo

(57) ABSTRACT

In an approach for a cooperative build and content annotation system for conversational design of virtual assistants, a processor formulates a build context based on a build activity of a user. A processor formulates one or more content queries based on the build context. A processor builds a content index by augmenting a text-search index with a neural Information Retrieval (IR) index. A processor searches the content index using the one or more content queries to identify content relevant to the build context. A processor determines at least one recommendation for the user based on heuristic rules applied to the build context and the identified content, wherein each recommendation is a build suggestion or a content annotation suggestion.

18 Claims, 4 Drawing Sheets

(56) References Cited

OTHER PUBLICATIONS

Srivastava et al., "Desirable Features of a Chatbot-building Platform", 2020 IEEE International Conference on Humanized Computing and Communication with Artificial Intelligence (HCCAI), 2020, 4 Pages.

Srivastava et al., "Contextual Reactive Pattern on Chatbot building Platforms", Proceedings of the European Conference on Pattern Languages of Programs 2020, ACM, Article 6, 2020, 8 Pages.

Valtolina et al., "Visual design of dialogue flows for conversational interfaces", Behaviour & Information Technology, 40:10, Apr. 28, 2021, 17 Pages.

* cited by examiner

| Neural embeddings | Content / Content-fragments |
|---|---|
| Neural_embed_fn (How to close an account) | DOCUMENT-1 |
| Neural_embed_fn (Savings) | DOCUMENT-1, DOCUMENT-1.SECTION-5 |
| Neural_embed_fn (Stocks and shares) | DOCUMENT-1, DOCUMENT-1.SECTION-4 |

COOPERATIVE BUILD AND CONTENT ANNOTATION FOR CONVERSATIONAL DESIGN OF VIRTUAL ASSISTANTS

BACKGROUND OF THE INVENTION

The present invention relates generally to the field of virtual assistants, and more particularly to a cooperative build and content annotation system for conversational design of virtual assistants.

A virtual assistant, in the context of the present invention, is an application program that understands natural language voice commands and completes tasks for a user. Virtual assistants are typically cloud-based programs that require internet-connected devices and/or applications to work. The technologies that power virtual assistants require massive amounts of data, which feeds artificial intelligence (AI) platforms, including machine learning, natural language processing and speech recognition platforms. As the end user interacts with a virtual assistant, the AI programming uses sophisticated algorithms to learn from data input and become better at predicting the end user's needs.

Domain knowledge required to build virtual assistants is often present in documented content and may be very useful in building conversation models. Current state of the art focuses on automatic annotation of documented content using known conversational meta-models and automatic building of conversation models from the annotated content. However, content authors that produce enterprise content are different from users that build virtual assistants. Content authors do not particularly focus on producing content specifically structured to facilitate its conversational annotation. Hence, these current methods fall short of being practically useful.

SUMMARY

Aspects of an embodiment of the present invention disclose a method, computer program product, and computer system for a cooperative build and content annotation system for conversational design of virtual assistants. A processor formulates a build context based on a build activity of a user. A processor formulates one or more content queries based on the build context. A processor builds a content index by augmenting a text-search index with a neural Information Retrieval (IR) index. A processor searches the content index using the one or more content queries to identify content relevant to the build context. A processor determines at least one recommendation for the user based on heuristic rules applied to the build context and the identified content, wherein each recommendation is a build suggestion or a content annotation suggestion.

BRIEF DESCRIPTION OF THE DRAWINGS

FIG. 3 depicts an example of a neural Information Retrieval index, in accordance with an embodiment of the present invention.

DETAILED DESCRIPTION

Figure 1:
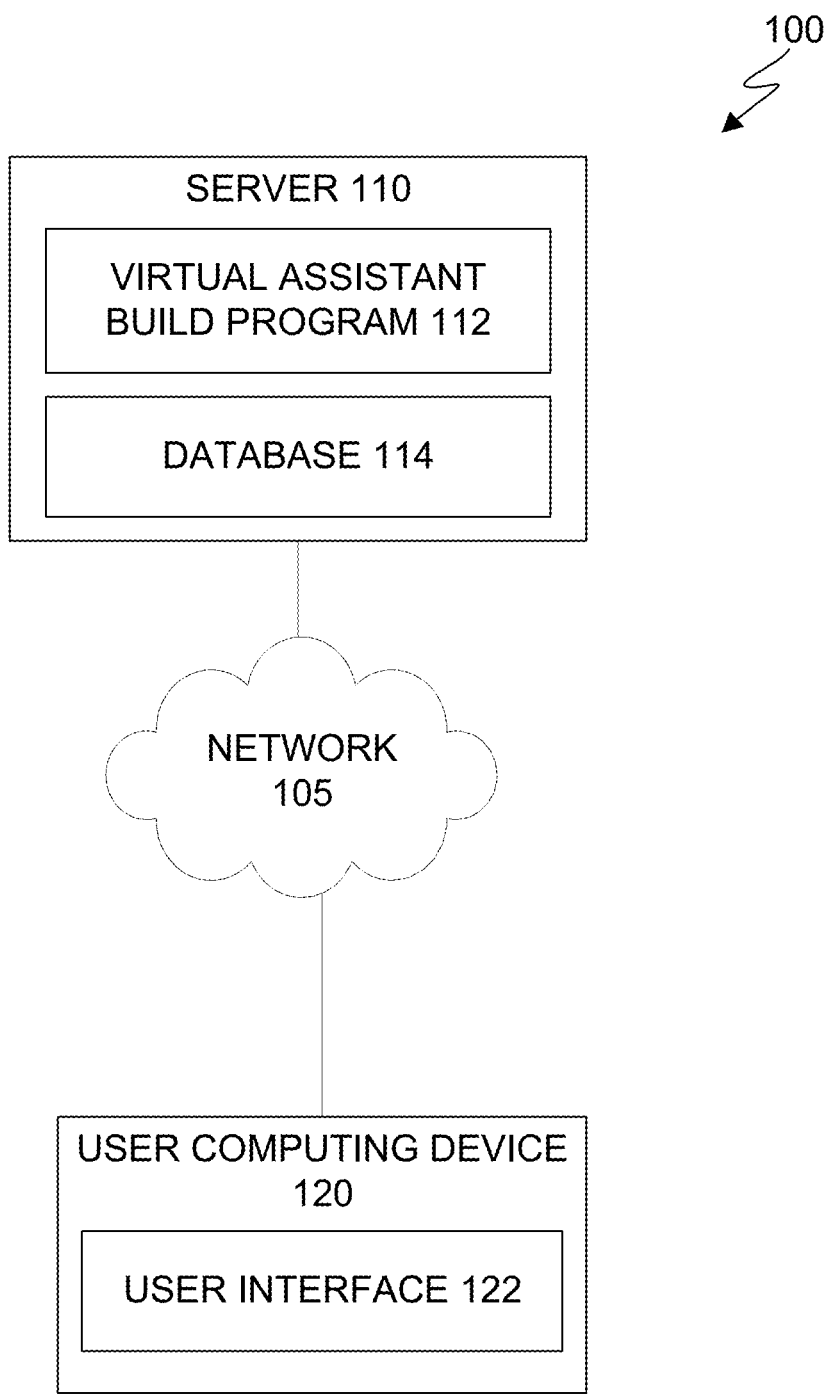
FIG. 1 is a functional block diagram illustrating a distributed data processing environment, in accordance with an embodiment of the present invention.

Embodiments of the present invention recognize that a joint and cooperative model that (1) surfaces relevant content while building a conversation, (2) recommends a build suggestion from annotated content, and (3) recommends annotations from built model will offer significant practical use over the current state of the art. Thus, embodiments of the present invention provide a system and method for producing an enhanced assistant model for building a virtual assistant and for producing enhanced content with conversation relevant annotations. The system takes inputs from two perspectives—a build activity perspective and an annotation activity perspective—and applies a joint and cooperative method of build recommendations and content annotations. From the build activity perspective, the system takes as inputs an assistant model and a specific selection in the assistant model as the build context. From the annotation activity perspective, the system takes as input a content store, a state-of-the-art search index on content in the content store, and a content selection context (if any).

Embodiments of the present invention provide a cooperative build and content annotation system for conversational design of virtual assistants that (1) gathers build context, (2) formulates content queries, (3) searches a content index, (4) performs a cooperative evaluation of recommendations, and (5) presents (and potentially applies) the recommendations. Embodiments of the present invention provide a cooperative process where the task of building a conversational system helps the task of annotating related content, and vice versa (i.e., the task of annotating content helps the task of building a conversational system on related topics). In a general model for a virtual assistant build system, an assistant can have one or more "skills", e.g., a "banking skill". A skill can have many "actions", e.g., "transfer money" action or "open account" action. An action can have many steps, e.g., "ask for transfer amount" step.

The following definitions and abbreviations are to be used for the interpretation of the claims and the specification. As used herein, the term "build" is used to mean "the act of creating a conversation model", e.g., creating an action, a step, a step prompt or answer, an expected customer response of a step, a condition of a step, etc.

As used herein, the term "build context" is used to mean "the information that can be extracted from the conversation editor based on the current elements (e.g., actions, steps or data types) being edited by the conversation designer". For example, if a conversation designer created a new action, then the action (along with all its properties) is the build context. In another example, if a conversation designer created a new step and defined details of the step, then that action step (along with all its properties) is the build context. In a final example, if a conversation designer is trying out the conversation in a preview, then the action/step that last generated the response is the build context.

As used herein, the term "action step" is a single interaction between the user and a bot (e.g., "ask for name" step). As used herein, the term "action" is a self-contained conversation path that consists of multiple actions (e.g., a "transfer money" action). As used herein, the term "action intent" is the intent that triggers the virtual assistant to start executing the associated action (e.g., "intent to transfer money"). As used herein, the term "intent example" refers to user utterances that express an action intent (e.g., "I want to transfer money to my account" is a user example for "transfer money" action).

As used herein, the term "annotate" is used to mean "the act of adding metadata to content fragments in order to link the fragment to some specific conversation context", e.g., adding a property with value "Savings" to a <div> fragment in an HTML page, which is informing about "savings accounts". In a conversation where this HTML page is relevant, such an annotation may be used to select the most relevant fragment, e.g., if the account-type being discussed is "Savings".

Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and user computing device 120, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, user computing device 120, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with user computing device 120 and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes virtual assistant build program 112 and database 114. Server 110 may include internal and external hardware components, as depicted and described in further detail with respect to FIG. 4.

Virtual assistant build program 112 operates to allow conversation designer to cooperatively build and annotate content for conversational design of virtual assistants. In the depicted embodiment, Virtual assistant build program 112 is a standalone program. In another embodiment, Virtual assistant build program 112 may be integrated into another software product, e.g., virtual assistant design software package. Virtual assistant build program 112 is depicted and described in further detail with respect to FIG. 2.

Database 114 operates as a repository for data received, used, and/or output by virtual assistant build program 112. Data received, used, and/or generated may include, but is not limited to, a build context, relevant content found, and any other data received, used, and/or output by virtual assistant build program 112. Database 114 can be implemented with any type of storage device capable of storing data and configuration files that can be accessed and utilized by server 110, such as a hard disk drive, a database server, or a flash memory. In an embodiment, database 114 is accessed by volumetric clustering program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that virtual assistant build program 112 has access to database 114.

User computing device 120 operates as a computing device associated with a user on which the user can interact with virtual assistant build program 112 through an application user interface. In the depicted embodiment, user computing device 120 includes an instance of user interface 122. In an embodiment, user computing device 120 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 120 represents one or more programmable electronic devices or combination of programmable electronic devices capable of executing machine readable program instructions and communicating with other computing devices (not shown) within distributed data processing environment 100 via a network, such as network 105.

User interface 122 provides an interface between virtual assistant build program 112 on server 110 and a user of user computing device 120. In one embodiment, user interface 122 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 122 enables a user of user computing device 130 to view and/or manage output of virtual assistant build program 112.

Figure 2:
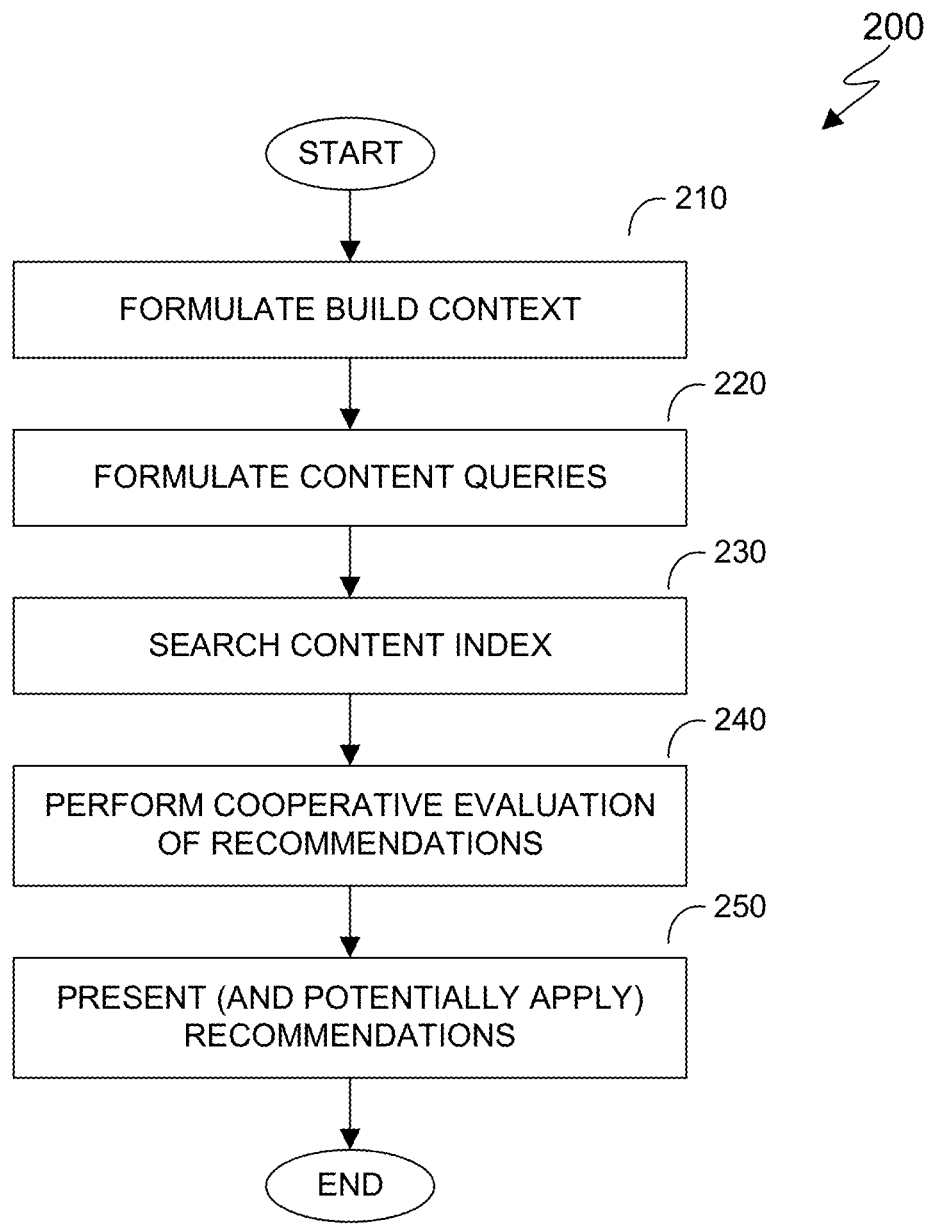
FIG. 2 is a flowchart depicting operational steps of a virtual assistant build program, for a cooperative build and content annotation system for conversational design of virtual assistants, running on a server of the distributed data processing environment of FIG. 1, in accordance with an embodiment of the present invention.

FIG. 2 is a flowchart 200 depicting operational steps of virtual assistant build (VAB) program 112, for cooperatively building and annotating content for conversational design of virtual assistants, running on server 110 of distributed data processing environment 100 of FIG. 1 in accordance with an embodiment of the present invention. It should be appreciated that the process depicted in FIG. 2 illustrates one possible iteration of VAB program 112, which can be repeated each time a user (e.g., a conversation designer or annotator) initiates the program.

In step 210, VAB program 112 formulates a build context. In an embodiment, responsive to a user initiating VAB program 112, VAB program 112 formulates a build context based on a build activity the user was engaged in at the time of initiating the program. The build context may include one or many conversation building blocks, such as an action intent, an action step, an action (with no specific selection, hereinafter an "unspecified action"), or a skill. A build activity can be anything related to creating or editing an action and/or an action intent. VAB program 112 supports a range of granularities in relation to build contexts to consider in determining content recommendations. At one end, content recommendations may be wanted for a very granular, step-level context, which may be preferred by a user when incrementally and progressively building an action. At the other end, a user may prefer a broader skill/action-level context when looking to annotate content fragments guided by already built conversation models.

In step 220, VAB program 112 formulates content queries. In an embodiment, based on the build context, VAB program 112 formulates one or more content queries, also known as content-search queries.

If the build context is an action intent, VAB program 112 formulates one or more content queries based on intent examples, i.e., examples of how the user may express a conversational intent that may then trigger a conversation (an action).

If the build context is an action step, VAB program 112 formulates one or more content queries using an action intent as well as the step prompt/answer. If the action step is a question step, VAB program 112 formulates the one or more content queries using the expected customer response in addition to the action intent, e.g., if the expected customer response is one of a set of options, the options are used to formulate the one or more content queries. If the action step has conditions, VAB program 112 formulates the one or more content queries using the conditions in addition to the action-intent and/or expected customer response.

If the build context is an action, VAB program 112 treats this as a bulk improve attempt for the action and recursively explores each action step in the action in formulating one or more content queries. If the build content is a whole skill, VAB program 112 recursively explores all build contexts in the skill, e.g., each action in the skill, and for each action, the action steps. When the build context is a skill, VAB program 112 recursively explores all actions of the skill and all the steps of each action. When the build context is an action, VAB program 112 recursively explores all the steps of that action. In these two embodiments, when handling multiple granular build contexts, VAB program 112 may be parallelized for each build context and recommendations (as determined in the following steps) can be segregated by build context or aggregated into a single view.

In step 230, VAB program 112 builds a content index and searches the content index. In an embodiment, VAB program 112 builds a content index using indexing techniques that can identify and index content building blocks, i.e., content fragments.

In an embodiment, VAB program 112 builds a content index by augmenting a known state-of-the-art text-search index for content and content-fragment texts, e.g., term frequency-inverse document frequency (TF-IDF) and best matching ranking function (BM25), with special handling for annotations, i.e., an awareness of conversational annotations and/or meta properties. In an embodiment, because there can be so many conversational annotation schemes, VAB program 112 generalizes handling of conversational annotation schemes by defining a canonical representation that is close to the build environment specification, e.g., action, step, condition, response, option, sequence, and datatype, and adding mappings from different annotation schemes to canonical. For example, VAB program 112 can build the context index with a mapping of "Question" to "action intent" and "Answer" to "step response". In another example, VAB program 112 can build the content index with a mapping for "HowTo" to action, "HowTo.name" to action intent, "HowToSection" to action step, "HowToSection.name" to step title, and "HowToSection.itemListElement.text to step response.

In an embodiment, VAB program 112 builds a neural Information Retrieval (IR) index on conversational content annotations. In an embodiment, VAB program 112 builds the neural IR index as an Approximate Nearest Neighbor (ANN) index on neural embeddings of text values of canonical conversational annotations on content fragments, an example of a neural IR index is depicted in FIG. 3, which depicts an example mapping 300 of neural embeddings to content or content fragments.

In an embodiment, VAB program 112 searches both the augmented text-search index and the neural IR index in parallel for the one or more content queries on the build context. In an embodiment, VAB program 112 combines search results for computing a final combined relevance score. By combining the results of the two indexes, VAB program 112 produces improved relevance scores, and thus identifies more relevant content for the build context.

In step 240, VAB program 112 performs a cooperative evaluation of recommendations. In an embodiment, for each relevant content, VAB program 112 performs a cooperative evaluation of potential recommendations based on the (granular) build context and the search results. A recommendation may be an actionable build suggestion (e.g., add a new step based on annotated content, add a new response step, etc.) or actionable content annotation suggestions (e.g., annotate content fragments using relevant step options). An actionable build suggestion may include a new step or a step modification with content grounded suggestions for step conditions, assistant responses, and customer response types/values based on available annotations. An actionable content annotation suggestion may include annotations suggestions for content (and/or fragments of content) based on their mapping to an action title, a step title, a step constraint, or a step expected datatype/value.

For example, a conversation designer is using a document titled "how to close an account" that has various sections describing the process of closing specific types of account (e.g., savings, loan, stock, etc.) and a has a conversation action titled "Close an account", which has a step titled "Account-type" that expects to present various account-type options to the user and collect user's account-type selection. VAB program 112 may suggest an annotation (HowTo) for the whole document, another annotation (HowTo.name="Close an account") for the document title, and further annotations for specific document sections (e.g., HowToSection.name=savings, HowToSection.name=loan, HowToSection.name=stock etc.) mapping to the expected option values for the account-type step.

In an embodiment, for performing this cooperative evaluation, VAB program 112 takes as input the pair of the build context and the relevant content identified by the search performed in step 230. For this input, the build context is the granular action intent or action step level context. Coarser or broader contexts are broken down into such granular contexts as described in step 220. From the input, VAB program 112 uses heuristic rules for determining recommendations to output, with the heuristic rules being based on what the build context is and whether the relevant content (i.e., the search results) is annotated or not.

The heuristic rules used by VAB program 112 for determining recommendations will now be defined and described. If the build context is an action title and content fragments are annotated, VAB program 112 determines recommendations to be (1) annotations defining step-sequences such as suggesting new step(s) with corresponding assistant responses and conditions (if constraint annotations are present), (2) annotations defining options such as suggesting new step(s) with options or suggesting follow on steps conditioned on option values with assistant responses based on annotated fragment content, and (3) annotations defining other data-types such as suggesting a new step with data-type expected as customer response by the step. If the build context is an action-title and content fragments are not annotated, VAB program 112 determines recommendations to be annotating the root content-fragment with a value based on the action title. If the build context is an action step and content fragments are annotated, VAB program 112 determines recommendations to be (1) to match annotated fragments with available action step details (i.e., title, constraints, and collected datatype) and (2) to analyze gap between available annotations on the matched fragment and the available step details. For analyzing the gap, if the gap is in action step, VAB program 112 recommends step modifications based on gaps, and if the gap is in fragment annotations, VAB program 112 recommends annotations based on gaps. If the build context is an action step and content fragments are not annotated, VAB program 112 matches fragments with available action step details and suggests fragment annotations based on available step details.

In step 250, VAB program 112 presents (and potentially applies) recommendations. In an embodiment, VAB program 112 presents actionable cooperative recommendations to the user (e.g., conversation designer or annotator). In an embodiment, VAB program 112 presents the recommendations as content fragment preview tiles, in a content detail view, content overlayed with highlighted annotations, or suggested actions. In an embodiment, for presenting the recommendations, VAB program 112 takes as input the search results from step 230 and the recommendations determined in step 240. From these inputs, VAB program 112 organizes and/or prioritizes the recommendations before outputting them by presenting them to a user. In an embodiment, VAB program 112 organizes a list of the recommendations by category (e.g., category for build recommendations and category for annotation recommendations), by recommendation type or activity (e.g., a new step, modify step, annotate fragments, etc.), or any combination of these. In an embodiment, VAB program 112 prioritizes the list of the recommendations or masks certain recommendations based on user roles. For example, VAB program 112 presents only build recommendations to a conversation model designer user or only content annotation recommendations to an annotator user. In an embodiment, VAB program 112 presents recommendations to annotate content fragments by highlighting proposed annotations, i.e., overlaying the proposed annotations over rendered content, or using other visual styles, e.g., color coding, for cognitive ease. In some embodiments, VAB program 112 additionally presents annotation recommendations as interactive mappings from build contexts such as step-options (or other datatypes) to content fragment representations such as fragment headings or their semantic summaries. Such mappings allow for interactive corrections/rejections by a user before applying the recommendations.

In some embodiments, VAB program 112 enables the user to interact with and apply the recommendations. In some embodiments, VAB program 112 automatically applies the recommendations to accelerate the build and annotation process. In these embodiments in which recommendations are automatically applied (e.g., upon application of annotation recommendation), VAB program 112 performs an incremental re-evaluation to determine if the application of the recommendation leads to any new build suggestions.

For build recommendations that involve a new step, VAB program 112 automatically applies the recommendation by appending new steps to the action from the build context with the step title, prompt and response, condition, and expected datatype of the step as a part of the suggested step definition. If options datatype is being suggested as a part of the new step, VAB program 112 applies the recommendation by proposing further conditional steps based on each option value, and if chosen, may automatically append those additional steps to the action from the build context. For build recommendations that involve modifying a step, VAB program 112 automatically applies the recommendation by applying the recommended changes to the step from the build context. To enable best practices for build recommendations, VAB program 112 proposes a parameterized link to content (if possible) instead of copying content for step responses.

For annotation recommendations, VAB program 112 automatically applies the recommendations based on two considerations—where to store the content annotations and where to map content with annotations. In an embodiment, VAB program 112 stores the mapping from suggested annotations to content fragments either in the original Content Management System (CMS), which manages the content lifecycle (including authoring, storage, and publishing), when configured and permitted or in an auxiliary storage when configured such that the mapping is retrievable given the original content URL. In an embodiment, VAB program 112 may use one or more mapping strategies, such as an in-line with content strategy or an external to content strategy. In the in-line with content strategy, annotations are in-lined with content, e.g., a fragment header <H1> tag may be annotated by adding an annotation property and value directly to the tag, like microdata tags. In the external to content strategy, a separate mapping is maintained between the fragment reference and the annotations, and the fragment reference may be defined, e.g., as full CSS or XPath selector for webpage content fragments.

In some embodiments, annotation recommendations may also be triggered on copy-paste events across the content and build domains. For example, a user explicitly selects a content fragment from a detailed view of a content recommendation and pastes it as a step response. In an embodiment, VAB program 112 recognizes such a copy-paste event and determines an annotation recommendation for the content fragment copy-pasted into a step as any option value on which the step may be conditioned.

Figure 4:
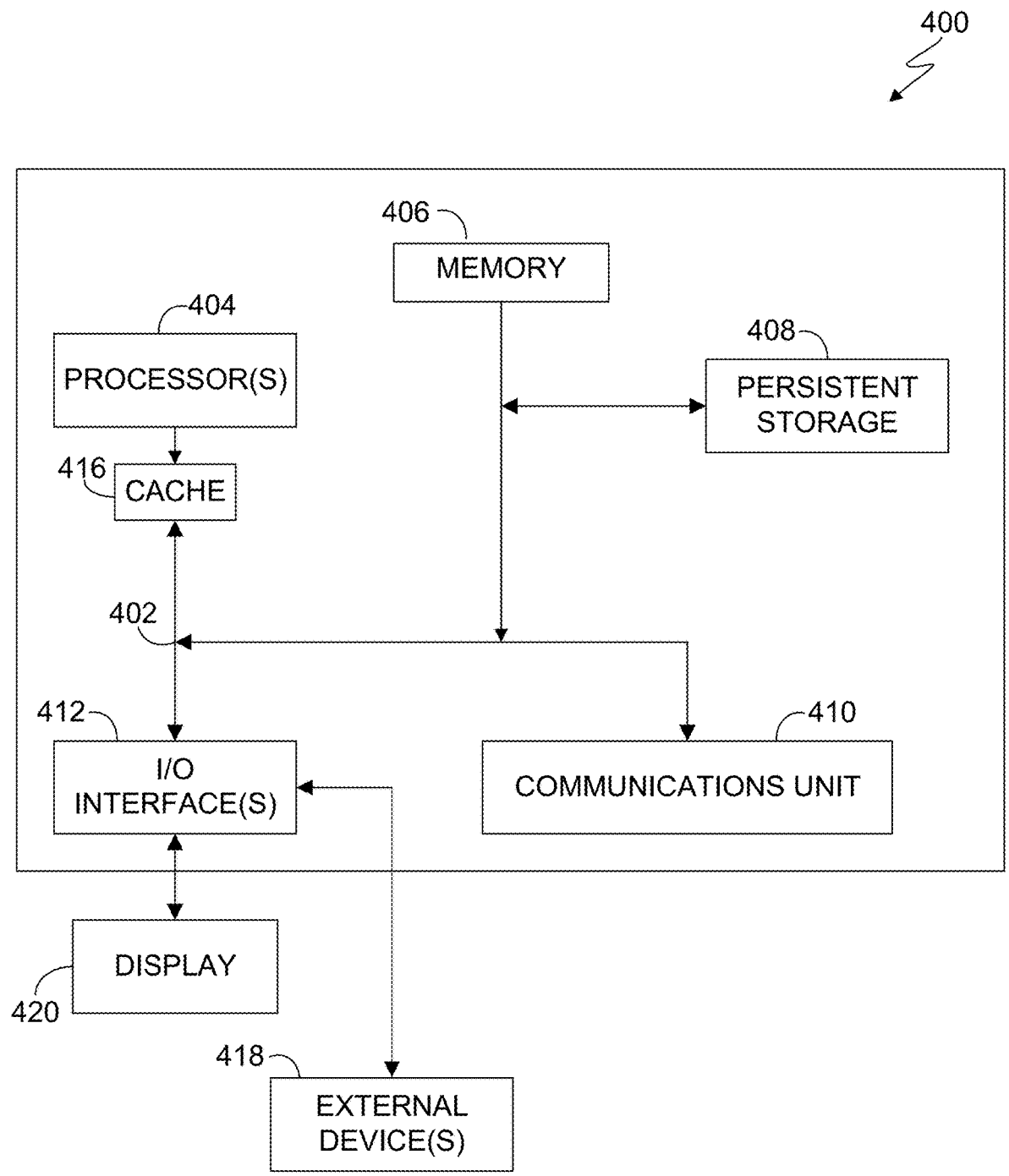
FIG. 4 depicts a block diagram of components of the server of the distributed data processing environment of FIG. 1, for running the virtual assistant build program, in accordance with an embodiment of the present invention.

FIG. 4 depicts a block diagram of components of computing device 400, suitable for server 110 running volumetric clustering program 112 within distributed data processing environment 100 of FIG. 1, in accordance with an embodiment of the present invention. It should be appreciated that FIG. 4 provides only an illustration of one implementation and does not imply any limitations regarding the environments in which different embodiments can be implemented. Many modifications to the depicted environment can be made.

Computing device 400 includes communications fabric 402, which provides communications between cache 416, memory 406, persistent storage 408, communications unit 410, and input/output (110) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs may be downloaded to persistent storage 408 through communications unit 410.

I/O interface(s) 412 allows for input and output of data with other devices that may be connected to server 110. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    formulating, by one or more processors, a build context based on a build activity of a user;
    formulating, by the one or more processors, one or more content queries based on the build context;
    building, by the one or more processors, a content index for content and content-fragment texts by augmenting a text-search index with ability to handle conversational annotation schemes defined by a canonical representation according to a build environment of the build activity;
    building, by the one or more processors, a neural Information Retrieval (IR) index on conversational content annotations;
    searching, by the one or more processors, the content index and the neural IR index in parallel using the one or more content queries to identify content relevant to the build context;
    determining, by the one or more processors, at least one recommendation for the user based on heuristic rules applied to the build context and the identified content, wherein each recommendation is a build suggestion or a content annotation suggestion.

2. The computer-implemented method of claim 1, further comprising:
    presenting, by the one or more processors, the at least one recommendation to the user.

3. The computer-implemented method of claim 1, further comprising:
    automatically applying, by the one or more processors, the at least one recommendation to the build activity of the user.

4. The computer-implemented method of claim 3, further comprising:
    responsive to automatically applying the at least one recommendation, performing, by the one or more processors, an incremental re-evaluation to determine if application of the at least one recommendation leads to additional build suggestions.

5. The computer-implemented method of claim 1, wherein the build context is an action intent, an action step, an action, or a skill.

6. The computer-implemented method of claim 1, wherein the neural IR index is an approximate nearest neighbor (ANN) index built on neural embeddings of text values of canonical conversational annotations on content fragments.

7. A computer program product comprising:
    one or more computer readable storage media and program instructions collectively stored on the one or more computer readable storage media, the stored program instructions comprising:
    program instructions to formulate a build context based on a build activity of a user;

program instructions to formulate one or more content queries based on the build context;

program instructions to build a content index for content and content-fragment texts by augmenting a text-search index with ability to handle conversational annotation schemes defined by a canonical representation according to a build environment of the build activity;

program instructions to build a neural Information Retrieval (IR) index on conversational content annotations;

program instructions to search the content index and the neural IR index in parallel using the one or more content queries to identify content relevant to the build context;

program instructions to determine at least one recommendation for the user based on heuristic rules applied to the build context and the identified content, wherein each recommendation is a build suggestion or a content annotation suggestion.

8. The computer program product of claim 7, further comprising:
program instructions to present the at least one recommendation to the user.

9. The computer program product of claim 7, further comprising:
program instructions to automatically apply the at least one recommendation to the build activity of the user.

10. The computer program product of claim 9, further comprising:
responsive to automatically applying the at least one recommendation, program instructions to perform an incremental re-evaluation to determine if application of the at least one recommendation leads to additional build suggestions.

11. The computer program product of claim 7, wherein the build context is an action intent, an action step, an action, or a skill.

12. The computer program product of claim 7, wherein the neural IR index is an approximate nearest neighbor (ANN) index built on neural embeddings of text values of canonical conversational annotations on content fragments.

13. A computer system comprising:
one or more computer processors;
one or more computer readable storage media;
program instructions collectively stored on the one or more computer readable storage media for execution by at least one of the one or more computer processors, the stored program instructions comprising:

program instructions to formulate a build context based on a build activity of a user;

program instructions to formulate one or more content queries based on the build context;

program instructions to build a content index for content and content-fragment texts by augmenting a text-search index with ability to handle conversational annotation schemes defined by a canonical representation according to a build environment of the build activity;

program instructions to build a neural Information Retrieval (IR) index on conversational content annotations;

program instructions to search the content index and the neural IR index in parallel using the one or more content queries to identify content relevant to the build context;

program instructions to determine at least one recommendation for the user based on heuristic rules applied to the build context and the identified content, wherein each recommendation is a build suggestion or a content annotation suggestion.

14. The computer system of claim 13, further comprising:
program instructions to present the at least one recommendation to the user.

15. The computer system of claim 13, further comprising:
program instructions to automatically apply the at least one recommendation to the build activity of the user.

16. The computer system of claim 15, further comprising:
responsive to automatically applying the at least one recommendation, program instructions to perform an incremental re-evaluation to determine if application of the at least one recommendation leads to additional build suggestions.

17. The computer system of claim 13, wherein the build context is an action intent, an action step, an action, or a skill.

18. The computer system of claim 13, wherein the neural IR index is an approximate nearest neighbor (ANN) index built on neural embeddings of text values of canonical conversational annotations on content fragments.

* * * * *